United States Patent [19]

Tsukada et al.

[11] 3,900,876

[45] Aug. 19, 1975

[54] AUTOMATIC OMEGA SIGNAL PATTERN SYNCHRONIZING SYSTEM

[75] Inventors: Kazuo Tsukada, Kakogawa; Mitsuru Sunagawa, Himeji; Yoshiharu Kanzaki, Akashi, all of Japan

[73] Assignee: Fujitsu Ltd., Kawasaki, Japan

[22] Filed: July 11, 1973

[21] Appl. No.: 378,312

[30] Foreign Application Priority Data

July 11, 1972 Japan .............................. 47-69400

[52] U.S. Cl. ...................... 343/105 R; 178/69.5 R

[51] Int. Cl.[2] ........................................ G01S 1/30

[58] Field of Search ........... 178/69.5 R; 179/15 BS; 343/105 R

[56] References Cited

UNITED STATES PATENTS

| | | | |
|---|---|---|---|
| 3,573,828 | 4/1971 | Hawley et al. | 343/105 R |
| 3,789,408 | 1/1974 | Ichihara et al. | 343/105 R |

*Primary Examiner*—Malcolm F. Hubler
*Assistant Examiner*—Richard E. Berger
*Attorney, Agent, or Firm*—Staas & Halsey

[57] ABSTRACT

An automatic omega signal pattern synchronizing system in which signals above a certain level are detected from received signals of omega signals transmitted in a time divisional manner; a signal of a certain duration is detected from the signals above the certain level; a pulse produced at the instant of the fall of the detected signal is frequency divided to provide a reset pulse for an omega pattern generator; a plurality of code signals of the omega pattern generator are selected; synchronized state memory circuits corresponding to the selected code signals are set by pulses at the instant of the rise of the code signals; the time difference between the selected code signals and the signal above the certain level is detected; and when the time difference exceeds a certain value, the synchronized state memory circuits are reset, by which, when the synchronized state memory circuits are all in their set state, resetting of the omega pattern generator is inhibited to synchronize the omega pattern generator with the received signal.

5 Claims, 4 Drawing Figures

AUTOMATIC OMEGA SIGNAL PATTERN SYNCHRONIZING SYSTEM

BACKGROUND OF THE INVENTION

1. Field of the Invention

This invention relates to an automatic synchronizing system for an omega signal pattern in radio navigation.

2. Description of the Prior Art

As is well-known in the art, omega navigation is one kind of hyperbolic navigation utilizing electric waves, in which eight fixed transmitting stations A to H are placed on the earth to effect transmission in a time divisional manner, as depicted in FIG. 1. The transmitting frequencies used are 10.2KHz, 13.6KHz and 11⅓KHz. As to a signal of the frequency 10.2KHz, the stations A to H transmit it for durations of 0.9, 1.0, 1.1, 1.2, 1.1, 0.9, 1.2 and 1.0 seconds respectively, with a period of 10 seconds. This is a system such that, by receiving the electric waves and comparing the phases of the electric waves transmitted from the transmitting stations with each other, the position at which the signals are received can be measured to enable determination of an accurate route.

When receiving signals transmitted in a time divisional manner, a receiver for use in the omega navigation is required to select the received signals according to their transmitting stations and, for this purpose, a pattern generated by an omega pattern generator built in the receiver is made coincident with a received pattern. To perform this, it is the practice in the art to display simultaneously the input signal and the output signal from the omega pattern generator on an oscilloscope and visually monitor their conicidence in terms of time. However, its synchronizing operation requires skill and is time-consuming. Especially where the receiving location is far away from each transmitting station, the received signal is small and noise is mixed therein, so that the signals transmitted from only about one to three stations relatively near the receiving station can be detected and their outputs of received signals also appear for a short period of time, making the synchronizing operation difficult.

SUMMARY OF THE INVENTION

An object of this invention is to provide a novel automatic omega signal pattern synchronizing system which is free from the aforesaid defects experienced in the prior art and in which, by selecting at least two of transmitting stations whose signals are received with relatively large amplitude, a resetting operation of the omega pattern generator is repeatedly achieved to provide automatic synchronization and, when once synchronized, the resetting operation is stopped and the synchronizing operation is automatically performed.

The automatic omega signal pattern synchronizing system of this invention is characterized in that signals above a certain level are detected from received signals; a signal continuing for a certain period of time is detected from the above detected signals; a pulse at the instant of the fall of the signal is frequency divided and used as a reset pulse of a pattern generator; more than two code signals are selected from an output of the pattern generator, each of a plurality of synchronizing state memory circuits is set by the pulse at the instant of the rise of the code signal; the difference in time between each selected code signal and the signal above the certain level is detected; when the time difference is in excess of a certain value, each of the synchronizing state memory circuits is reset; and when each synchronizing state memory circuit is in its set state, resetting of the pattern generator is inhibited.

DESCRIPTION OF THE PREFERRED EMBODIMENTS

Figure 2:
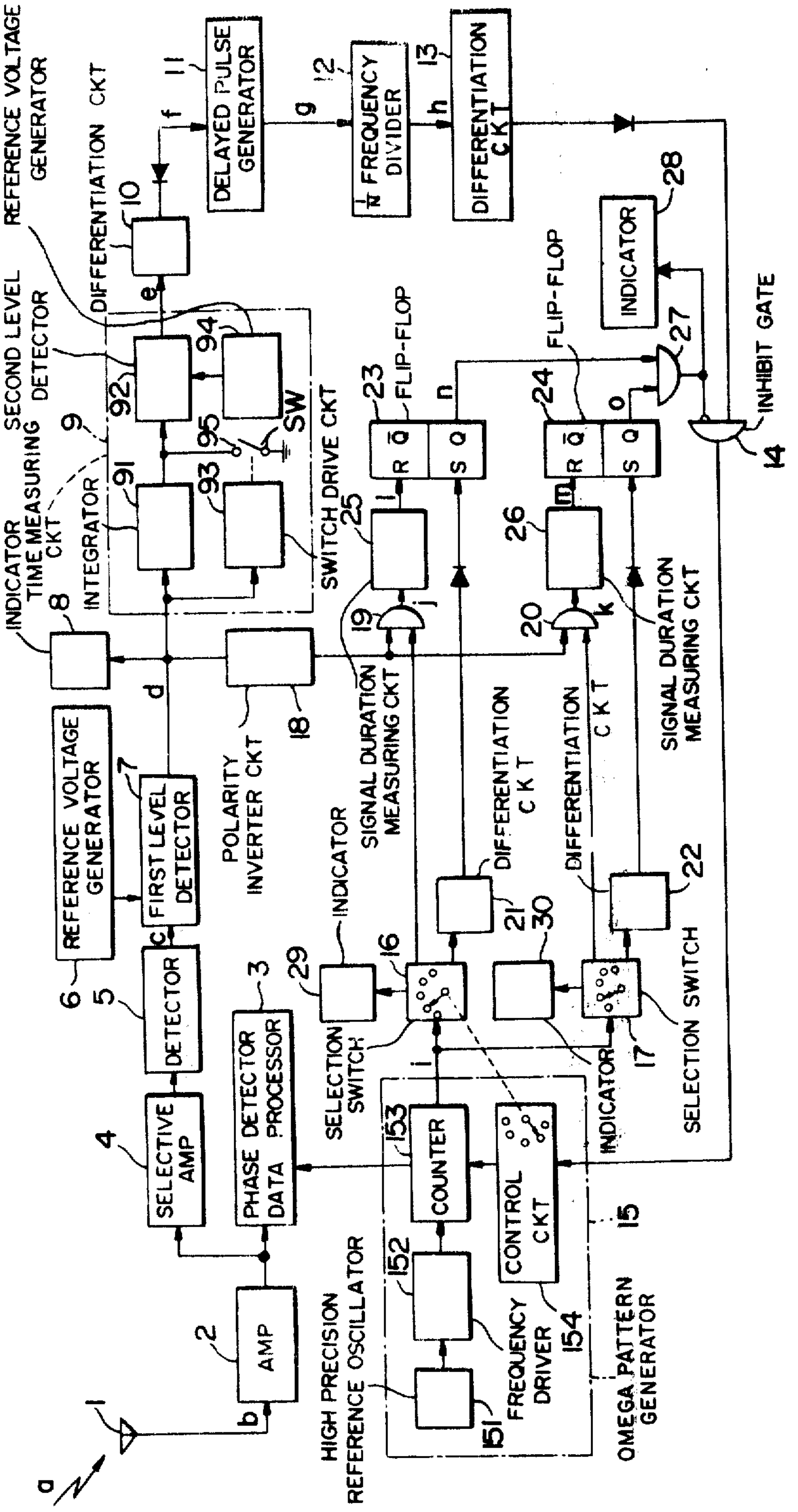
FIG. 2 is a block diagram illustrating an example of this invention.
Figure 3:
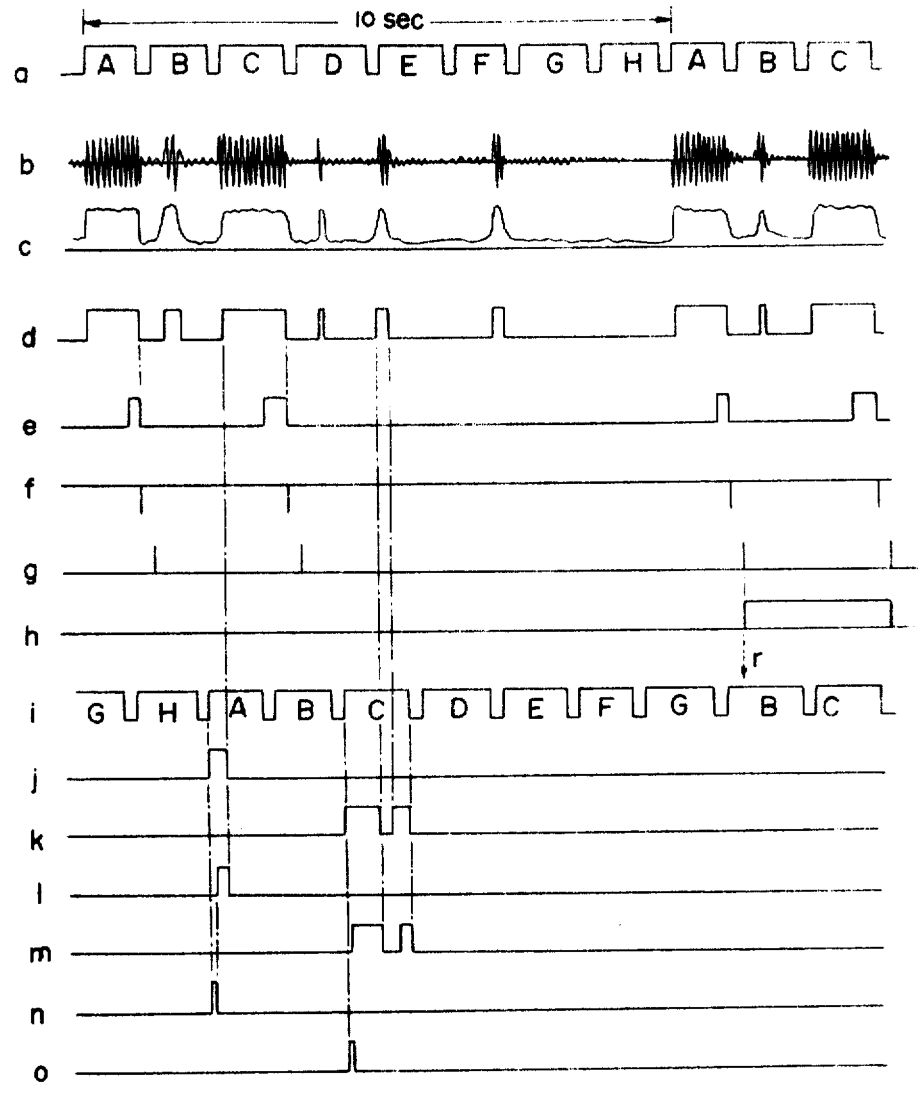

FIG. 2 shows in block form an example of this invention and FIGS. 3a to 3o a series of voltage waveform diagrams, for explaining the operation of the example of FIG. 2, with FIGS. 3*a* to 3*o* corresponding to one another. The letters a to o indicate the presence of the signal waveforms as shown in FIGS. 3*a* to 3*o*, respectively, at the designated portions of the circuit of FIG. 2. The fundamental frequency 10.2KHz of the transmitting stations has a period of 10 seconds as shown in FIG. 3a and it is received by an antenna 1. FIG. 3*b* shows the received signal in the case where electric waves from the transmitting stations, for example, A and C, are received with relatively large amplitude. The received signal is amplified by an amplifier 2 and one portion of its output is phase detected by a phase detector-data processor 3 to effect data processing necessary for position measurement. However, the method of data processing is not essential to this invention. Further, the other portion of the output from the amplifier 2 is amplified by a selective amplifier 4 and AM noises are removed therefrom by a correlator, a bandpass filter or the like; then, the amplified output is envelope detected by a detector 5. As a result, a detected output such as depicted in FIG. 3*c* is obtained from the detector 5. The detected output is applied to a first level detector 7, in which a detected output above a certain level is detected by a voltage from a reference voltage generator 6 to provide an output shown in FIG. 3*d*. This output is indicated by an indicator 8 such as a lamp or the like and, at the same time, is fed to a signal duration time measuring circuit 9. The signal duration time measuring circuit 9 comprises an integrator 91, a second level detector 92, a switch drive circuit 93 for actuating a switch 95, a reference voltage generator 94 and so on. The output from the first level detector 7 is integrated by the integrator 91 and converted into a sawtooth wave signal. When the output *d* is "0", the switch drive circuit 93 actuates the switch 95 to short-circuit the output from the integrator 91 and when the output *d* is "1", the switch 95 is opened. Consequently, the signal applied to the second level detector 92 is delayed a certain period of time behind the rise of the received signal but falls simultaneously with the received signal, providing an output shown in FIG. 3*e*. Thus, a received signal *d* whose duration is longer than a certain value is detected by the time measuring circuit 9. The signal duration measuring circuit 9 may be a circuit of the type that the signal duration is measured in a digital form by counting the number of clock pulses in the signal duration by suitable means such as a counter.

The output from the signal duration measuring circuit 9 is differentiated by a differentiation circuit 10 and then only a signal at the instant of the fall of the differentiated output, as shown in FIG. 3*f* and taking the form of only a negative spike is applied to a delayed pulse generator 11. The output as shown in FIG. 3g from the delayed pulse generator 11 is delayed a certain period of time with respect to its input signal and is applied to a 1/N frequency divider 12. When supplied with N's pulses, the frequency divider 12 applies one pulse to a differentiation circuit 13 and the output of the frequency divider 12 is shown, for example, in FIG. 3*h*. The output of the differentiation circuit 13, shown at *r* and corresponding to the instant of the rise of the frequency divider output pulse of FIG. 3*h* is applied through an inhibit gate 14 to reset an omega pattern generator 15. The frequency divider 12 causes the resetting operation to be performed once while the output pattern of the omega pattern generator 15 circulates twice. Where eight transmitting stations are all provided, there are some occasions when signals transmitted from five stations at most are received according to the receiving point, so that it is desirable to select N to be larger than 5.

The omega pattern generator 15 comprises a high precision reference oscillator 151, a frequency divider 152, a counter 153 and a control circuit 154, and produces a pattern shown in FIG. 3i. The output from the omega pattern generator 15 is applied to code selection switches 16 and 17, and the phase detector-data processor 3. When an "A" code is selected by the code selection switch 16, the omega pattern generator 15 is actuated to start its operation from the beginning of a "B" code by a reset pulse applied through the inhibit gate 14. Signals F, G, B and C in FIG. 3*i* shows the above-described operation, and signal *r* as seen in FIG. 3*h* indicates the reset pulse. In a like manner, when the B code is selected by the code selection switch 16, the omega pattern generator 15 is actuated to start its operation from the beginning of a "C" code by the reset pulse.

One part of the output from the first level detector 7 is fed to a polarity inverter circuit 18, and the polarity-inverted output therefrom is applied to AND gates 19 and 20 together with the outputs from the code selection switches 16 and 17 to obtain a logical product. Further, the outputs from the code selection switches 16 and 17 are differentiated by differentiation circuits 21 and 22 respectively and their outputs corresponding to the instant of the rise serve as set pulses of flip-flops 23 and 24. Reference numerals 25 and 26 indicate signal duration measuring circuits, which are identical in construction with the aforedescribed circuit 9 and measure the duration of the outputs from the AND gates 19 and 20.

Where the output of the first level detector 7 and the outputs of the code selection switches 16 and 17 are coincident in time with each other, the outputs from the AND gates 19 and 20 are "0" and the flip-flops 23 and 24 are held in their set state. Where the A and C codes are selected by the code selection switches 16 and 17 respectively, if such outputs as depicted in FIGS. 3*d* and 3*i* are derived from the first level detector 7 and the omega pattern generator 15 respectively, the outputs from the AND gates 19 and 20 become such as depicted in FIGS. 3*j* and 3*k*, respectively. Accordingly, the outputs from the signal duration measuring circuits 25 and 26 becomes such as illustrated in FIGS. 3*l* and 3*m* respectively, by which the flip-flops 23 and 24 are reset. Consequently, the flip-flops 23 and 24 are set by the outputs from the differentiation circuits 21 and 22 respectively at the instant of the rise of the selected code and reset by the outputs from the signal duration measuring circuits 25 and 26 respectively, thus providing such outputs from the flip-flops 23 and 24 as shown in FIGS. 3*n* and 3*o* respectively. The outputs from the flip-flops 23 and 24 are applied to an AND gate 27. When the output from the AND gate 27 is "1", an inhibit signal is applied to the inhibit gate 14 to stop the supply of the reset pulse to the omega pattern generator 15. Namely, where the outputs of the two selected codes and the received signal are coincident with each other within an allowable period of time, synchronization is judged to have been obtained and the resetting operation is stopped and, at this instant, an indicator 28 is actuated. Indicators 29 and 30 are provided for further confirmation of the synchronized state, i.e. the synchronized state is confirmed by simultaneous indication by the indicators 8, 29 and 8, 30.

Figure 1:
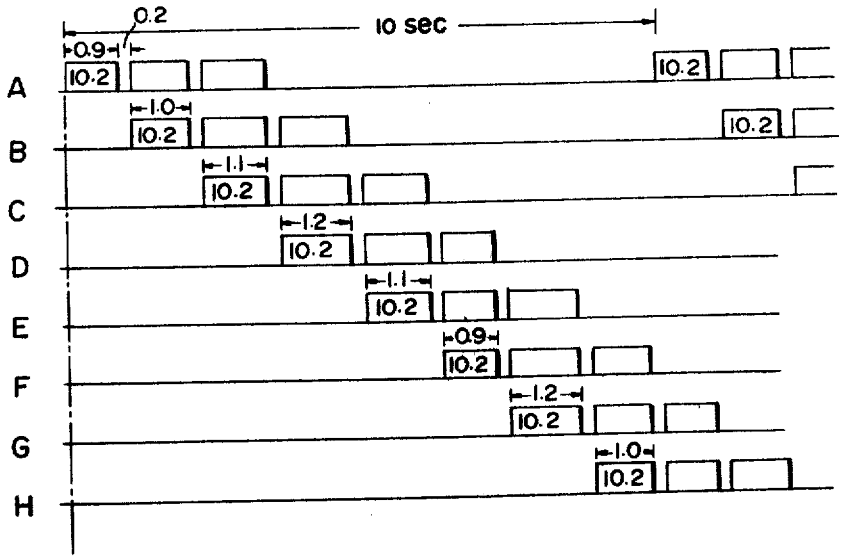
FIG. 1 shows a series of diagrams, for explaining transmitted patterns from transmitting stations of omega navigation.
Figure 4:
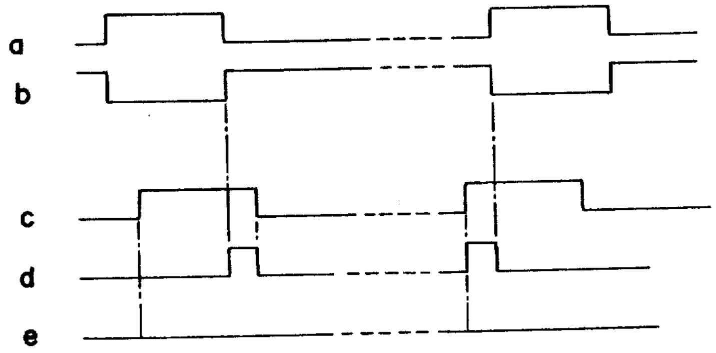
FIGS. 3 and 4 are waveform diagrams, for explaining the operation of the example of FIG. 2.

FIG. 4 shows a series of waveforms, for explaining the relationships of advance and delay between the received signal and the pattern generated by the omega pattern generator 15. FIG. 4*a* indicates the output from the first level detector 7, FIG. 4*b* refers to the output from the polarity inverter circuit 18, FIG. 4*c* shows the generated pattern signal, FIG. 4*d* indicates the logical product output, and FIG. 4*e* shows the set pulse for the flip-flop which is obtained at the instant of the rise of the generated pattern signal. The waveforms on the left-hand side show the case where the generated pattern signal is delayed and those on the right-hand side the case where it is advanced. In either case, if the logical product output exceeds a certain period of time, the flip-flop is reset and the omega pattern generator 15 is supplied with a reset pulse through the inhibit gate. However, if the logical product output has a time width smaller than the set time of the signal duration measuring circuit, the flip-flop is not reset and two flip-flops 23 and 24 are continuously held in their set condition, from which the synchronization is judged to have been attained and resetting of the omega pattern generator 15 is stopped by the inhibit gate 14.

The aforesaid code selection switches 16 and 17 and the flip-flops 23 and 24 can each be caused to perform coincidence judgement with respect to the code signals of more than two stations. Further, since the flip-flops 23 and 24 are provided to store the state of synchronization with each code signal, other memory circuits may also be employed. The polarity inverter circuit 18 and the AND gates 19 and 20 serve to detect the time difference between the received signal and the code signal, so that it is also possible to omit, for example, the polarity inverter circuit 18 and use the AND gates 19 and 20 as inhibit gates and employ their inhibit inputs as the output from the level detector 7.

As has been described in the foregoing, in the present invention, that signal of received signals which is above a certain level and continues for a certain period of time is regarded as a signal transmitted from a transmitting station, a pulse at the instant of the falling of this signal is applied as a reset pulse to the omega pattern generator to reset it to achieve a synchronizing operation, pattern generation is caused by the resetting to start from a code subsequent to the selection code and this eliminates the possibility of an erroneous operation with a signal of short duration such as a noise.

Of the outputs from the omega pattern generator, output code signals of more than two selected stations and received signals are compared with each other respectively and if the both signals coincide with each other more than twice with a certain time difference therebetween, they are judged as synchronized with each other and erroneous synchronization with other station is not effected.

Further, the coincidence of the selection code signal with the received signal is stored by the synchronized state memory circuit formed with a flip-flop or the like and coincidence with each selection code implies the synchronized state, so that an indication of the synchronized state can be thereby provided and the operation can be stabilized by inhibiting the resetting of the omega pattern generator.

In order that the omega pattern generator may not be repeatedly reset during one rotation of its output pattern, the 1/N frequency divider is provided, by which the synchronizing operation is ensured. The 1/N frequency divider may be replaced with a scale-of-N counter.

With the selection of at least two stations, the synchronizing operation is automatically carried out as described in the foregoing, facilitating measurement of the position in the electric wave navigation. The present invention is applicable to Decca, HI-FIX and like systems, other than the omega navigation system.

It will be apparent that many modifications and variations may be effected without departing from the scope of the novel concepts of this invention.

What is claimed is:

1. An automatic omega signal pattern synchronizing system comprising detection means responsive to a received signal for providing a first output indicative of a received signal above a predetermined level and a second output indicative of the received signal above a predetermined level also having a predetermined duration, a pattern generator producing an output signal, means responsive to the second output of said detection means for resetting said pattern generator, and means for detecting the time difference between said first output of said detection means and the output signal of said pattern generator and producing an inhibit output signal when the output signal of said pattern generator is synchronized with the received signal within a predetermined time difference for inhibiting the resetting of said pattern generator.

2. An automatic omega signal pattern synchronizing system according to claim 1, wherein said means for resetting said pattern generator comprises means for generating a pulse in synchronism with the instant of fall of the second output of said detection means, and means for frequency dividing said pulses generated in synchronism with the instant of fall of the second output to produce frequency-divided, corresponding reset pulses for resetting said pattern generator.

3. An automatic omega signal pattern synchronizing system according to claim 1, wherein said detection means comprises means for detecting the envelope of a received signal, level detection means for comparing the detected envelope with a reference voltage of a predetermined level and producing said first output when said detected envelope exceeds said predetermined level of said reference voltage, means responsive to the output of said level detection means for producing a sawtooth wave, and means for comparing the sawtooth wave with further predetermined level and producing said second output when the sawtooth wave exceeds said further predetermined level, thereby detecting the duration of the received signal.

4. An automatic omega signal pattern synchronizing system according to claim 3, wherein said detection means includes means responsive to the leading edge of the output of said level detection means for generating a clock pulse, and digital means actuated by the clock pulse for detecting the time width of the output of said level detection means.

5. An automatic omega signal pattern synchronizing system comprising detection means responsive to a received signal for providing a first output indicative of a received signal above a predetermined level and a second output indicative of the received signal above a predetermined level also having a predetermined duration; means for generating a pulse at the instant of fall of the second output of said detection means; a pattern generator producing plural output code signals; means for frequency dividing the pulses generated at the instant of fall of the said second output of said detection means to produce corresponding, frequency-divided, reset pulses for resetting said pattern generator; selection means for selecting and deriving at least first and second code signals from the output of said pattern generator; at least first and second synchronized state memory circuits responsive to the rise of the selected, said at least first and second code signals, respectively, for being set thereby; means for measuring the time differences between the occurrence of said selected, at least first and second code signals of said plural output code signals of said pattern generator and said first output of said detection means; operative when the time difference exceeds a certain value for resetting the corresponding said synchronized state memory circuits, and means responsive to the simultaneous set condition of all said synchronized state memory circuits for inhibiting the resetting of said pattern generator.

* * * * *